Nov. 23, 1965  H. N. EAGLETON  3,218,660
BALL VALVE FOR PIGGING SYSTEM
Filed Oct. 4, 1963  2 Sheets-Sheet 1
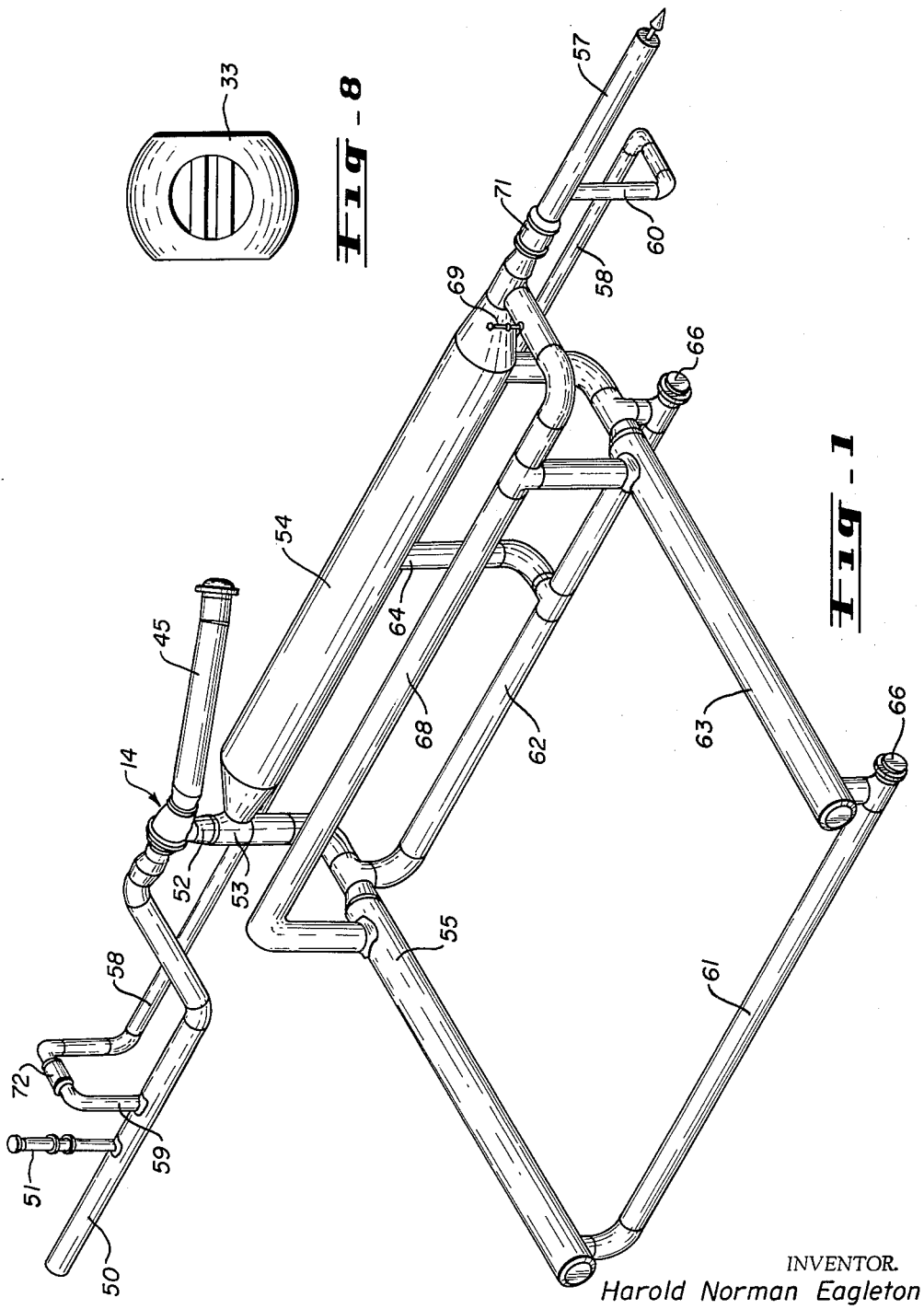
INVENTOR.
Harold Norman Eagleton
BY
ATTORNEYS Nov. 23, 1965  H. N. EAGLETON  3,218,660
BALL VALVE FOR PIGGING SYSTEM
Filed Oct. 4, 1963  2 Sheets-Sheet 2
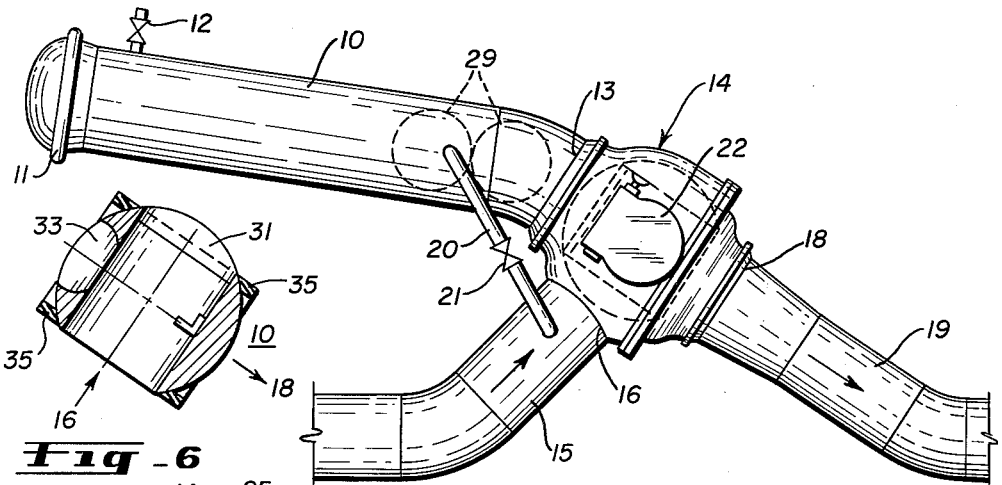
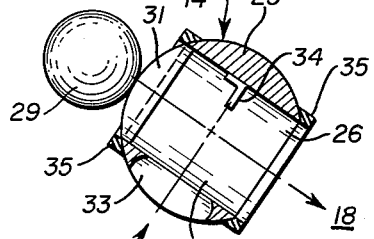
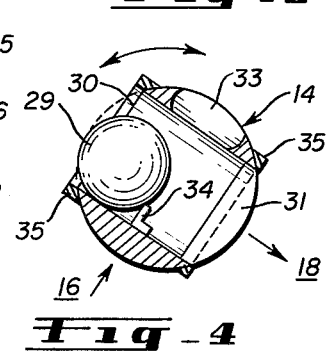
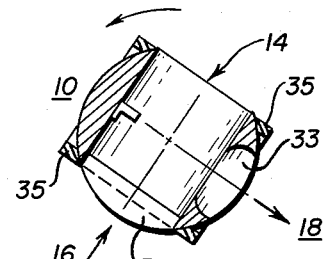
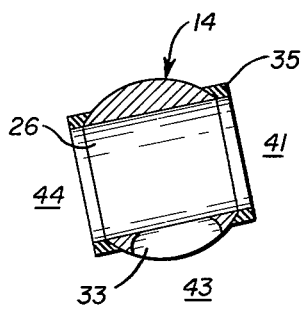
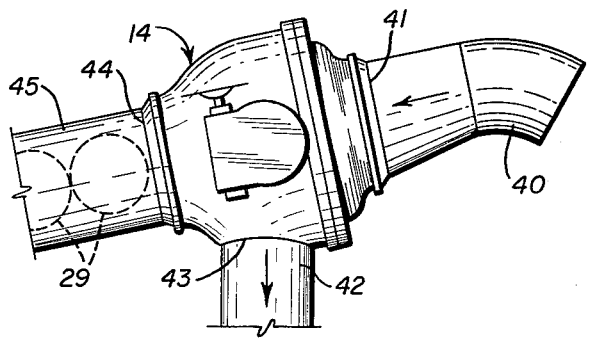
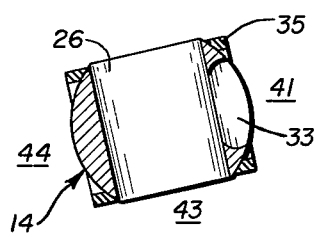
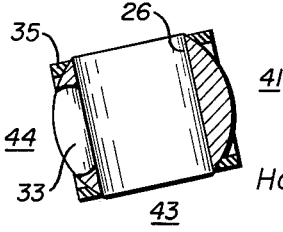
INVENTOR.
Harold Norman Eagleton
BY
ATTORNEYS

United States Patent Office 3,218,660
Patented Nov. 23, 1965

3,218,660
BALL VALVE FOR PIGGING SYSTEM
Harold Norman Eagleton, 1313 Camina Vega,
Farmington, N. Mex.
Filed Oct. 4, 1963, Ser. No. 313,845
9 Claims. (Cl. 15—104.06)

This invention relates to sphere launchers and receivers for pipelines, and more particularly the invention relates to a ball valve type launcher and receiver for launching and receiving plugs, balls, spheres, pig-balls, etc., in pipelines and to the system for the use of such launchers and receivers.

The pipe transportation industry extensively uses traveling plugs, such as spherical members or pig-balls, in the pipelines. The pipeline is often comprised of a plurality of diameter sizes, and it is desirable to inject a sphere or plug at intervals along the pipeline in accordance with the diameter variances therein. The balls are used for various purposes such as cleaning out condensate in the lines, as an interface between different fluids flowing through the pipe, cleaning fouled or partially clogged pipes and so forth. In the use of these balls which pass through the line along with the fluid traveling in the line, some means must be used to launch or inject the spheres into the line and a means is necessary to remove the spheres from the lines at predetermined points.

According to the present invention there is provided an inexpensive and novel sphere launcher and receiver. The spheres or plugs usable in the systems may be inflatable, flexible and hollow spheres, or they may be rigid plastic compositions or flexible, solid spheres. The invention includes a ball-type valve which as a launcher valve injects a single sphere or plug into the pipeline while positively preventing the dumping of a plurality of spheres during a single launching operation. As a receiver valve it removes the spheres or plugs from the main fluid stream. Also, while functioning as either a launcher valve or receiver valve, the present ball-type valve can be positioned to block, or shut off, the flow of fluid through the pipeline.

Included in the objects and advantages of the present invention is the novel ball-type valve for injecting spheres into and removing spheres from fluid transmission pipelines.

Another object is to provide a novel launching apparatus wherein a single sphere may be injected into the pipeline and which simultaneously prevents the next succeeding sphere from entering the pipeline during a single launching operation.

Another object is to provide a receiving valve for pipeline spheres wherein the flow of fluid therethrough is diversed from the sphere for facilitating the capturing of the sphere and the valve seals off the pipeline pressure from the receiving barrel for facilitating the removal of the captured spheres from the receiving barrel.

Another object is to provide a launching apparatus that can also function as a block valve in the pipeline.

Another object is to provide a receiving apparatus that can also function as a block valve in the pipeline.

Another object is to provide a launching apparatus that will not stop the flow of fluid through the pipeline during any part of the launching cycle.

These and other objects and advantages of the invention may be readily ascertained by referring to the following description and appended illustrations in which:

FIG. 1 is a general partially schematic view of a typical example of a pipeline sphere receiving and liquid removal system;

FIG. 2 is a side elevational view, partially schematic, of a launcher utilizing a valve according to the invention;

FIGS. 3, 4, 5 and 6 are schematic views of a valve according to the invention showing the different positions of the valve for a launching sequence;

FIG. 7 is a detailed view of a receiver for ball pigs according to the invention;

FIG. 8 is a plan view of the grate portion of the ball valve of the invention; and FIGS. 9, 10 and 11 are schematic views of a valve according to the invention showing different portions of the valve plug for receiving spheres from a line.

In the device illustrated in FIG. 2 a launcher for spheres (or other movable plugs) is shown. The launcher includes a sphere storage chamber or barrel with a closable inlet 11 and bleed valve 12. The barrel 10 is a tubular member interconnected with port 13 of the valve, shown in general by numeral 14, which is constructed according to the invention. The valve provides a means of charging spheres into a fluid transportation line. An inlet line 15 is interconnected with inlet port 16 of the valve, and outlet line 19 is interconnected to outlet port 18 of the valve. An equalizing line 20, controlled by a valve 21, provides means for equalizing the pressure in sphere storage with that of the inlet line. A housing 22 is provided for enclosing gearing for turning or rotating the valve manually. The valve may, of course, be rotated by a pneumatic, hydraulic, or electric power operator.

The valve 14 is a ball-type valve having a spherical plug rotatably mounted in a cylindrical seat. The plug is arranged to rotate 360° in one plane. This permits movement of the passages in the plug so as to register with each port.

The plug, shown in cross-section in FIG. 3, includes a body 25 with a straight passage 26 extending therethrough, the passage being circular and of a size to pass a sphere 29 therethrough. The passage 26 has a full open port 30 at one end and a grate 31 covering the opening at the opposite end of the passage. A side passage 32 communicating with passage 26 is provided with an opening 33, so as to permit the passage of fluid. Grate 31 controls the movement of a sphere into and out of the passage 26. A sphere stop 34 is secured internally in the passage and is of a size to prevent passage of a sphere directly through the passage 26 yet is spaced so that a sphere 29 fits inside the ball plug while it is being rotated. The ball plug seats in a typical seat 35 which permits the plug to rotate 360° in one plane.

The sequence of operation of the valve using a launcher is shown in FIGS. 3, 4 and 5, wherein FIG. 3 shows a normal operating position of the plug with the grate 31 preventing the passage of spheres 29 from the storage barrel 10 into the passage 26 in the plug. The grate permits the barrel to be pressurized to line pressure when turned in the position of FIG. 3. This grate also permits the flow of gas through the valve when it is in the position of FIG. 5 and the sphere supply barrel 10 is closed by the plug body 25. Similarly the opening 33 is positioned over the inlet port, FIG. 3, while the full opened end 30 of the passage 26 is in register with the outlet port of the valve. In this position fluid entering the inlet port from the inlet line 15 passes through the opening 33 into the passage 26 and subsequently into the outlet line 17 through outlet port 18. For launching a sphere, the ball plug is rotated to the position illustrated in FIG. 4 where the full opening 30 permits a sphere 29 to enter the passage 26 butting against the stop 34. It is seen that the sphere 29 is prevented from moving against the grate 31 by the stop 34. In this position the inlet port 16 is open with gas entering the valve going around body 25 and inside the valve body 14 through opening 33 and subsequently through outlet 18. For launching the sphere the ball plug is rotated again to the position of FIG. 3 which deposits the sphere into the outlet line 19. The flow of fluid and gravity move the sphere into the line.

When it is desired to isolate the storage barrel the valve plug is rotated in the position of FIG. 5 where the valve plug blocks the storage barrel 10, but the inlet port 16 is open through the valve into the outlet port 18. In this position the barrel may be opening and additional spheres placed in the barrel. After charging the storage barrel the inlet 11 is closed and sealed and the bleed vent closed. The equalizing line is opened by means of valve 21 to pressure the barrel to line pressure.

Where it is desired to provide a sequence launcher, that is, where the launcher is located at a change in the pipeline size, and inlet line 15 is smaller than outlet line 19, the smaller sphere enters the valve through inlet passage 16 and the valve is rotated so that the sphere passes out port 30 into line 19. Then the larger sphere stored in barrel 10 may be launched either manually or automatically behind the smaller sphere by initiating the previously described launching sequence.

The valve of the invention, therefore, is a simple ball plug valve which may be described as a three-ported, double block and bleed ball valve. By rotating the valve body to the position of FIG. 6, the flow of fluid is blocked in either direction in the line. This is an important feature as it eliminates the need for an additional block valve in the pipeline. The valve may, thus, function both as a launching valve and as a block valve. The same valve with only a slight modification may be used as a receiving valve.

When used as a receiver, as shown in FIG. 7, an inlet line 40 is connected to the inlet port 41 of the valve 14. An outlet line 42 communicates with the outlet port 43 of the valve. A receiving barrel 45 is interconnected to the valve 14 through the receiver port 44, and it is arranged for holding the spheres 29 after they have been received by the valve 14. In this case, the valve 14 is constructed in a manner similar to that of the launching valve except that the opening 33 is covered with a grate, FIG. 8, and grate 31 and stop 34 are not required. Thus the valve is of the same configuration as the sequence launcher.

The sequence of operation of the receiver valve is illustrated in FIGS. 9, 10 and 11. In these figures the inlet port is shown as 41 adjacent the right-hand side, the storage port 44 is shown on the left-hand side, and the outlet port 43 is shown adjacent the bottom. In the position of FIG. 8, the passage 26 is arranged for receiving spheres from the inlet so that the spheres pass directly into the storage port while the fluid passes through the grate 43, the outlet port and into the line. Any spheres passing along the line are therefore automatically removed from the line and placed in the storage compartment 45. The storage barrel 45 has a similar closure to that shown at 11 in FIG. 2. When the storage barrel is filled and it is desired to remove the spheres from it, the plug is turned to the position of FIG. 10 where the block of the plug closes the storage port 44 and isolates it from the system. The pressure in the barrel can then be relieved, the closure opened and the spheres removed for reuse. The fluid is still flowing, passing through the opening 33 into the passage 26 which is open to the outlet 43. Any spheres approaching the valve are held by the grate until the valve is again rotated back to the position of FIG. 8 for passing spheres into the storage barrel.

Where it is desired to block fluid flow through the receiver from the unit, the valve is rotated to the position of FIG. 11 where a plug closes the inlet 41 and a valve, not shown, downstream on the outlet 43 may be closed so that the entire receiver unit is completely isolated from the system. This is done by a series of bypasses explained below.

In using the ball valve as a receiver valve, the inlet line may be isolated from the outlet line without an additional block valve. For example, in a lateral or a well line which is connected with a main or trunk line, a single valve, according to the invention, is all that is necessary in the lateral or well line. The ball valve receiver is placed in position ahead of the connection of the two lines. The valve of the invention not only provides means for receiving the spheres but also provides a means for completely shutting off the lateral or well line.

The installation of a typical use of the valve as a receiver according to the invention is shown in a liquid and gas system in FIG. 1. In this instance a gas supply line 50, provided with a blowoff stack 51, is connected to the inlet port of the valve 14 which is provided with a receiver barrel 45. The outlet 52 from the valve 14 is connected by a T 43 to a slug catcher 54 and a liquid reservoir 55. As the gas with carried liquid enters the valve, the spheres are removed from the fluid stream and deposited in the sphere reservoir 45, separated liquid passes into the liquid reservoir 55, and any slugs in the gas are separated in the slug catcher 54. Gas, from which the liquid has been removed, exhausts through line 57 to its destination. A bypass 58 is provided around the system by connecting the bypass at 59 on one side, which is ahead of the valve 14, and below the slug catcher 54 on the downstream side. A pair of equalizing lines 61 and 62 are interconnected with a second liquid reservoir 63 which also receives liquid from the slug catcher 54. A downcomer 64 is, also, connected from the slug catcher to the liquid reservoir system.

Cleanout ports 66 are provided in the system. A vent line 68 provides a vent for gas from the liquid reservoir to the downstream side of the slug catcher 54. A blowoff stack 69 is provided for the system. A full opening valve 71 is connected at the outlet which, along with valve 14, permits the entire system to be isolated and the bypass used to pass the fluid from the line 50 to the outlet 57. A bypass valve 72 provides closing for the bypass line 58. It is thus seen that the valve of the invention provides means for simplifying a system for use in launching and/or receiving spheres in a pipeline system.

When used as a launcher valve, the valve of the invention provides a means for launching a sphere into the pipeline without shutting off the gas, as shown in FIG. 2, where the sphere is launched into the line while the inlet is fully open to the outlet. This is an important function where an automatic pigging system is used, as it prevents a closed valve in case the automatic control fails halfway through the launching cycle, which would normally leave the gas valve closed.

While the invention has been described with reference to particular embodiments, there is no intent to limit the spirit or scope of the invention to the precise details so set forth except as defined in the following claims.

I claim:

1. A sphere launching valve for a fluid line comprising a body having at least an outlet port and first and second inlet ports, valve means having a passage therethrough and a side passage connected therewith mounted within said body arranged for selective movement from one position in which fluid flow through said first inlet is partially blocked and fluid bleeds around said valve means and said outlet is in position to receive a sphere to a second position in which said first inlet is opened for flow therethrough and said second inlet is closed, and further movable to a third position in which said outlet is closed and said inlets are opened, said valve means including a portion of said passage arranged to accommodate a sphere during turning and having a grate adjacent one port thereof arranged to arrest movement of spheres moved through said line by its flow while permitting line fluid to pass through said grate.

2. A sphere launching valve for a fluid line comprising a body having at least one outlet and first and second inlet ports arranged at angles to each other, spherical valve means rotatably mounted in one plane within said body and arranged for selective rotation from one position in which the flow through said first inlet port is partially blocked to a second position in which said first inlet port is open for flow therethrough and said outlet is open, and movable to a third position in which said outlet is closed and said two inlet ports are open, said spherical valve means including two connected passages therein, one passage permitting entrance of a spherical body from one of said ports, and a grate enclosing one end of one of said passages, said grate arranged to prevent movement of solid bodies through said valve and permit fluid to pass therethrough.

3. A sphere launching valve for a fluid line comprising a body having at least one outlet and first and second inlet ports arranged at angles to each other, spherical valve means rotatably mounted in one plane within said body and arranged for selective rotation from one position in which the flow through said first inlet port is partially blocked to a second position in which said first inlet port is open for flow therethrough and said outlet port is closed, and movable to a third position in which said outlet port is open and said second inlet port is open, means for passing fluid around said closed first inlet port to said outlet port, said valve means includes a passage extending through said valve means and a side passage connected therewith and a grate enclosing one end of said passage extending through said valve means, said grate arranged to prevent movement of solid bodies through said valve and permit fluid to pass therethrough.

4. A sphere launching valve comprising a valve body having a first inlet port and an outlet port approximately 180° therefrom, there being a second inlet port between said inlet and said outlet ports, a spherical plug mounted in said valve body and arranged to rotate 360° in one plane thereof, said spherical plug having a full diameter passage extending substantially directly therethrough and a side passage communicating with said direct passage, one end of said direct passage being covered by a grate to prevent passage of spheres therethrough, a sphere holding barrel interconnected with said first port on said valve, an outlet line connected with the opposite said outlet port and said valve being arranged to pass spheres to said line from said barrel, an inlet line being connected with said second port, and means for rotating said plug for movement of spheres from said barrel.

5. A sphere launching valve comprising a valve body having a barrel inlet port and an outlet port approximately 180° therefrom, there being a second inlet port in between said inlet and said outlet port, a spherical plug mounted in said valve body and arranged to rotate 360° in one plane thereof, said spherical plug having a full diameter passage extending substantially directly therethrough and a side passage communicating with said direct passage, one end of said direct passage being covered by a grate to prevent passage of spheres therethrough, a sphere supply barrel interconnected with said barrel inlet port on said valve, an outlet line connected with said outlet port opposite said sphere barrel port and said valve being arranged to pass spheres from said barrel to said line, an inlet line being connected with said second inlet port, and means for rotating said plug for movement of spheres from said barrel.

6. A sphere receiving valve comprising a valve body having an inlet port and a barrel outlet port 180° therefrom, there being a second outlet port in between said inlet and said barrel outlet port, a spherical plug mounted in said valve body and arranged to rotate 360° in one plane thereof, said spherical plug having a full diameter passage extending directly therethrough for movement of spheres therethrough and a side passage communicating with said direct passage, said side passage being covered by a grate to prevent passage of spheres therethrough, a sphere barrel interconnected with said barrel outlet port opposite said inlet port, an inlet line connected with the opposite said inlet port and said valve passage being arranged to pass spheres from said line to said barrel, an outlet line being connected with said second outlet port, and means for rotating said plug.

7. A sphere launching valve comprising a valve body having a first inlet port and an outlet port 180° therefrom, there being a second inlet port in between said inlet and said first outlet port, a spherical plug mounted in said valve body and aranged to rotate 360° in one plane thereof, said spherical plug having a full diameter passage extending directly therethrough inclusive of means for holding a sphere therein and a side passage communicating with said direct passage, the side of said valve opposite said side passage arranged to block a port which it is covering, means bypassing said block from said second inlet to said outlet for passing fluid therethrough, a sphere holding barrel interconnected with said first port and an outlet line connected with said outlet port and said plug arranged to pass spheres to said line from said barrel, an inlet line connected to said second inlet port, and means for rotating said plug for movement of spheres from said barrel.

8. A launching valve for the movement of spheres out of fluid carrying lines comprising a valve body having a first inlet port on one side and an outlet port directly opposite said body on the opposite side thereof, a second inlet port positioned between said first inlet and said outlet ports and arranged as a fluid inlet, a spherical plug mounted in said valve arranged for rotative movement therein, there being a full diameter passage extending directly through said plug and arranged to register with said first inlet and said outlet ports when in position, a lateral opening in said plug communicating with said direct passage and arranged for communicating with said fluid inlet when said passage is in register with said first inlet and said outlet port, stop means in said plug arranged to prevent movement of spheres through said valve, and means for supporting a sphere in said valve during rotation of said plug.

9. A launching valve for the movement of spheres into fluid carrying lines comprising a valve body having a first sphere inlet port on one side and an outlet port directly opposite said body on the opposite side thereof, a second inlet port positioned between said first inlet and said outlet ports, a spherical plug mounted in said valve arranged for rotative movement therein, there being a passage extending directly through said plug and arranged to register with said first inlet and said outlet ports when in position, a lateral opening in said plug communicating with said direct passage and arranged for communicating with said second inlet port when said passage is in register with said first inlet and said outlet ports, a port block on said plug opposite said lateral opening, means for passing fluid around said block when positioned over said second inlet port, stop means in said plug arranged to prevent movement of spheres through said valve, and means for supporting a sphere in said valve during rotation of said valve.

References Cited by the Examiner

UNITED STATES PATENTS

| | | | |
|---|---|---|---|
| 2,698,731 | 1/1955 | Koehler et al. | 137—625.47 X |
| 2,786,219 | 3/1957 | Meyer | 15—104.06 |
| 3,076,509 | 2/1963 | Burns et al. | 166—70 |
| 3,146,792 | 9/1964 | Donnelly et al. | 251—315 X |

CHARLES A. WILLMUTH, *Examiner.*

EDWARD L. ROBERTS, JR., *Assistant Examiner.*